June 3, 1969 L. GYUGYI 3,448,300

FIRING CIRCUIT FOR SOLID STATE CONTROLLABLE VALVES IN HIGH $ai/at$ APPLICATIONS

Filed Dec. 21, 1965

INVENTOR
Laszlo Gyugyi
BY
Clement J Paznokas
ATTORNEY

United States Patent Office 3,448,300
Patented June 3, 1969

3,448,300

FIRING CIRCUIT FOR SOLID STATE CONTROLLABLE VALVES IN HIGH di/dt APPLICATIONS

Laszlo Gyugyi, Penn Hills, Pittsburgh, Pa., assignor to Westinghouse Electric Corporation, Pittsburgh, Pa., a corporation of Pennsylvania Filed Dec. 21, 1965, Ser. No. 515,371
Int. Cl. H03k *3/26*
U.S. Cl. 307—252 8 Claims

ABSTRACT OF THE DISCLOSURE

Firing circuitry is disclosed for controlled switching devices such as silicon controlled rectifiers wherein a capacitor is charged during the OFF time of the switching device and is discharged into the gate electrode of the switching device at the same time that a conventional firing pulse is applied thereto, thereby providing a composite firing signal having a high initial amplitude which decays to the level of the conventional pulse.

This invention relates to firing circuits for controllable solid state valves operated in the switching mode, for example, semiconductor controlled rectifiers, and more specifically for use with solid state valves in high *di/dt* (rate of rise of anode current) applications.

Solid state controllable valves are provided with a current inlet terminal, a current outlet terminal, a main current( anode current) path extending internally from the current inlet to the current outlet terminal, and a control terminal for controlling the current flow through the main current path.

A widely used form of a semiconductor controlled rectifier is a silicon controlled rectifier. Such devices are characterized in that they normally block current flow in both directions. However, in response to the application of a control signal of appropriate magnitude and polarity to the control electrode of the valve, while the valve is voltage biased in a particular direction, the valve is rendered highly conductive (fired) in the latter direction, generally referred to as the forward direction. Conduction continues, even after removal of the control (firing) signal, until the main current through the valve falls below a predetermined minimum holding value. Turnoff of the valve may be forced by applying a sufficient reverse voltage across the valve (across the inlet and outlet electrodes).

The respective inlet, outlet, and control terminals of a semiconductor controlled rectifier are usually referred to as the anode, cathode and gate electrodes respectively.

With specific regard to silicon controlled rectifiers, forward voltage is applied to them when the anode is made positive relative to the cathode. With the appropriate positive voltage on the anode; that is, with the main current path of the valve forward biased, the valve will be fired (rendered conductive) when the gate electrode has applied thereto a voltage of appropriate polarity (usually positive) and magnitude to forward bias the gate-cathode junction.

A silicon controlled rectifier can be turned ON (rendered conductive) by a relatively small positive current injected into its gate electrode. The magnitude of this current (firing current) is usually specified on the manufacturers data sheet. For reliable operation the firing current is normally applied to the gate electrode during the total conduction time of the valve. During the nonconductive or OFF period (also known as the blocking period), a negative voltage is usually applied between the gate and cathode in order to decrease the sensitivity of the gate circuit to noises and thus to eliminate accidental firing. Although a conventional firing circuit is adequate for many applications, it does not normally provide a satisfactory drive for silicon controlled rectifiers operating into low impedance non-inductive loads where the rate of rise of anode current (*di/dt*) is not limited externally.

When a firing pulse is applied to the gate, only a very small area near the gate is turned ON, the area spreading with a very low speed across the device. As a consequence, all the anode or main current will flow initially through that small area causing a high current density in that region of the gate cathode junction. If the rate of rise of the anode current (*di/dt*) is very high, the local dissipation in the conducting area may be high enough to result in the failure of the silicon controlled rectifier. Two solutions are recommended by the manufacturers of such devices to overcome this problem: increase the initial gate drive current to increase the initial area turned ON, or control the rate of rise of the anode current by external means. In applications where the turn-ON time of the silicon controlled rectifier must be optimized, or a delayed anode current is disadvantageous for other reasons, the only solution for reliable operation is to increase the drive current initially for a short duration of time. The magnitude of the initial drive current required may be as much as 20 to 50 times higher than the drive current specified on the manufacturers data sheet for worst condition turn-ON. Any attempt to achieve a drive current of this magnitude by a conventional firing circuit would result in extremely uneconomical design, since all the components would have to be rated for the initial maximum current.

The present invention is directed to novel but simple circuit principles employed in connection with firing circuits to provide a very high initial firing current.

In accordance with one embodiment of the invention, energy stored in a capacitor during the OFF time of the valve is superimposed on a normal firing pulse at the control electrode to provide a composite firing current pulse having a momentary high peak at the beginning of the ON time of the valve.

A principal object of this invention is a firing circuit for a solid state controllable valve, which circuit provides high initial drive current.

Another object is to utilize stored energy derived from a reverse gate bias circuit during the OFF time of the valve to provide the momentary peak drive current at the beginning of the ON time of the valve.

These and other objects and advantages of the present invention will become more apparent from the following detailed description taken in conjunction with the drawings, in which.

Figure 1:
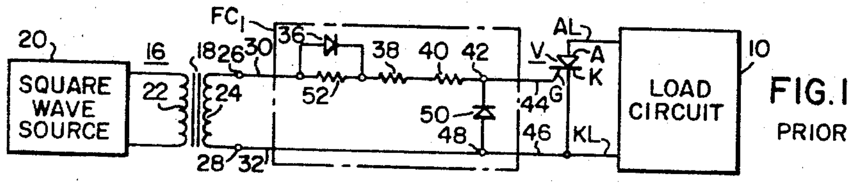
FIG. 1. PRIOR ART
FIG. 1 is a diagram of a prior art firing circuit.

In the prior art circuit of FIG. 1, a solid state controllable valve, for example a silicon controlled rectifier V, controls the current through a load circuit 10 which includes the load and a load power source. Valve V is provided with an anode A, a cathode K and a gate G. Desirably the circuit 10 would also include some means for turning OFF the valve V by applying a reverse bias thereacross at appropriate times. Anode A is shown as connected to the circuit 10 through anode line AL, while cathode K is connected to the circuit 10 through cathode line KL.

Valve V is turned ON (rendered conductive) at predetermined times by firing pulses applied to gate G from a firing circuit $FC_1$ that is energized from a control power source 16 including a transformer 18 and a square wave source 20. Transformer 18 is provided with an input (primary) winding 22 energized by the square wave source, and an output (secondary) winding 24 having output terminals 26 and 28 connected to input lines 30 and 32 of the firing circuit $FC_1$. The output wave shape of the square wave source 20 may have positive and negative durations of equal time, whereby the output wave of transformer 18 will have positive and negative alternations of equal duration as shown at (*a*) in FIG. 3 or, if desired, the arrangement may be such as to provide an output wave having unequal positive and negative durations.

During one-half cycle of input supplied to transformer 18, the transformer operates in a first mode to provide an output of one polarity. During the other half-cycle of input, the transformer operates in a second mode to provide an output of opposite polarity. Thus, it is seen that the transformer 18 is a dual mode source, which in one mode assumes a first output condition and in the other mode assumes a second output condition.

Figure 2:
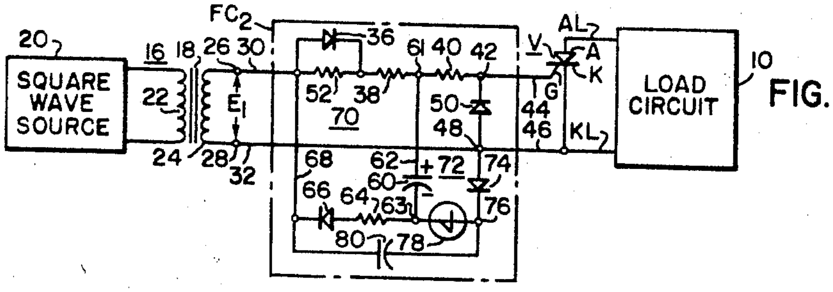
FIG. 2 is a schematic diagram of a preferred embodiment of the invention.
Figure 3:
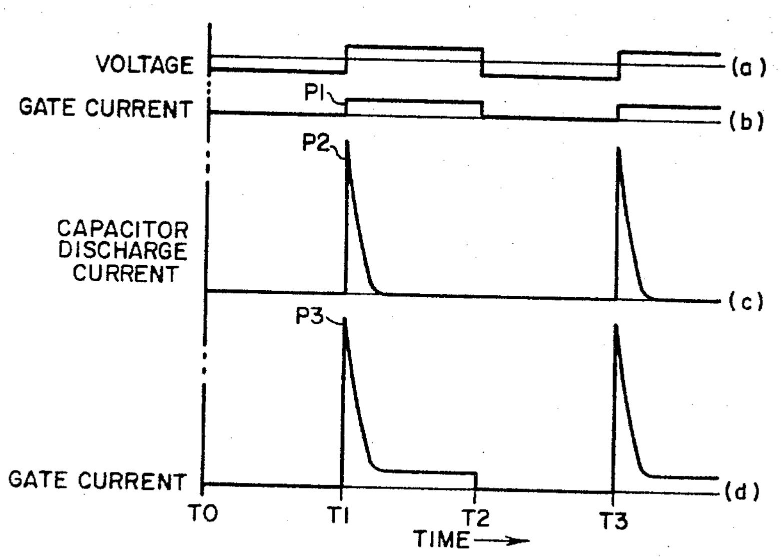
FIG. 3 is a chart of waveforms illustrating the operation of the circuit of FIG. 2.

When transformer 18 is in the mode wherein terminal 26 is positive, a firing pulse P1 as indicated at (*b*) in FIG. 3 is applied to the valve gate G through a circuit including input lead 30, an asymmetric device 36, resistors 38 and 40, a junction 42 and a line 44 connected to the gate G. The return path is from cathode line KL to terminal 28 through a line 46, a junction 48 and line 32. If valve V is forward biased at the time a pulse P1 is applied to the gate G, the valve will be fired, i.e. turned ON. For example, at time T1 in FIG. 2, the pulse P1 will turn ON valve V. At time T2, the pulse P1 terminates and the valve is turned OFF by application of a reverse bias or voltage applied to anode A by circuit operation in the load circuit 10.

In the other mode, when the transformer reverses and terminal 28 becomes positive, a reverse or negative bias is applied to the gate-cathode junction of valve V through a circuit which may be traced from terminal 28 through line 32, junction 48, as asymmetric device 50, the junction 42, resistors 40 and 38, a resistor 52, and back to the transformer through line 30 and terminal 26. Junctions 42 and 48 being connected to the gate G and cathode K respectively, the asymmetric device 50 is connected across the gate cathode junction of the valve V, and the voltage drop across the asymmetric device 50 provides a negative bias to the gate G. Asymmetric devices 36 and 50 may, for example, be semiconductor diodes. On the time basis of the chart in FIG. 2, the valve V is OFF from time T0 to time T1, ON from T1 to T2, OFF from T2 to T3, ON from T3 to T4, and so on.

While the firing circuit of FIG. 1 is adequate for many applications, it does not normally give satisfactory drive for semiconductor controlled rectifiers in connection with loads where the rate of rise of the anode current of the valve is very high.

As seen in FIG. 2, circuitry is added in accordance with the invention to the firing circuit of FIG. 1 to generate firing pulses having a high initial magnitude, for example, 2 or 3 amperes or about 10 times as high as the pulses P1 which, for example, are about 250 milliamperes.

In FIGURES 1 and 2 corresponding parts bear the same reference numerals and operate in the same manner. In FIG. 2 the firing circuit is labeled $FC_2$ and elements therein corresponding to those in $FC_1$ of FIG. 1 bear the same reference numerals and provide corresponding operation. In accordance with the invention a capacitor 60 is charged during the OFF time of valve V by the circuit which applies the negative bias to the gate G, and discharged into the gate G in response to the same mode of the transformer 18 which produces the firing pulse P1 as hereinbefore described.

By way of example consider the source voltage $E_1$ across the secondary of transformer 18 as about 14 volts. During that mode of transformer 18 when terminal 28 is positive and a negative bias is applied to gate G in the same manner as described in connection with FIG. 1, capacitor 60 is charged up to substantially the negative source voltage through a circuit which may be traced from terminal 28 through line 32, junction 48, diode 50, resistor 40, a junction 61, a line 62, capacitor 60, a junction 63, a resistor 64, an asymmetric device 66, a line 68, and back to the source through line 30 and terminal 26. Thus it is seen that the series-connected elements, line 62, capacitor 60, junction 63, resistor 64, diode 66, and line 68 form a charging circuit 70 for capacitor 60 that is connected across or in parallel with series connected resistors 52 and 38 which are part of the negative bias generating circuit. Thus the condenser charging circuit 70 is energized from the negative bias circuit during the OFF time of valve V. More specifically, capacitor 60 is charged to the polarity shown in FIG. 2 during the time T0 to T1 (FIG. 3) when terminal 28 is positive.

When the transformer terminal 26 swings positive at time T1, it triggers a discharge circuit 72 which discharges capacitor 60 into the gate G to provide a supplementary firing pulse P2 [(*c*) in FIG. 2] which augments the pulse P1 (produced as hereinbefore described) to provide a composite firing pulse P3, which as seen in FIG. 2 at (*d*) provides an initial high peak drive current that exponentially decays to the level of pulse P1. The discharge circuit 80 may be traced from the cathode K through line 46, junction 48, an asymmetric device 74, a junction 76, a voltage breakdown device 78, for example a breakdown diode, junction 63, capacitor 60, line 62, junction 61, resistor 40 and line 44 to the gate G. The voltage breakover device 78 normally blocks in both directions until the voltage across the device exceeds a predetermined level (known as breakdown or breakover voltage) at which time the impedance of the device drops sharply and heavy conduction takes place through the device. The breakdown device 78 is chosen to have a breakdown voltage greater than the capacitor charge voltage, but less than the source voltage $E_1$ and the capacitor charge voltage combined. For practical purposes the diode 78 breakdown voltage is chosen to be nearly twice as high as the source voltage $E_1$. The breakdown device 78 may, for example, be a semiconductor breakdown diode, a popular form of which is known as the 4-layer or Shockley diode.

When transformer terminal 26 swings positive at time $T_1$, the source voltage $E_1$ is substantially transmitted through a trigger circuit including a capacitor 80 to the junction 76 thereby subjecting diode 78 to the combined voltages (approximately 28 volts) of the source voltage $E_1$ and the capacitor charge voltage. As a result, diode 78 breaks down and discharges capacitor 60 into the gate G through the current limiting resistor 40. Choosing resistor 40 appropriately small (2 to 10 ohms), a peak drive current of several amperes can be achieved. Since the turn ON time of the diode 78 is less than 0.5 microseconds ,the rise time of the initial overdrive current is extremely fast, ensuring an optimum firing of the valve. Diode 74, which supplies high impedance to the positive trigger voltage applied to the breakdown diode 78 in a capacitor 80, may be replaced by an inductance which will supply momentary high impedance to the positive trigger voltage. However, the inductance is less efficient and less desirable.

At the instant that capacitor 60 starts to discharge, the voltage at junction 61 is a standoff between the transformer voltage and the capacitor voltage, and only a low current flows through resistor 38. As the capacitor discharges, it supplies the major portion of the gate current. However, as the capacitor continues to discharge, the voltage at junction 61 rises from near zero as the difference between the transformer and capacitor increases and current begins to flow through resistor 38 into the capacitor. When the junction 61 voltage nears or reaches the value of the gate-cathode drop of the valve (about 2 volts), the capacitor discharge current will fall below the holding current value of the diode 78, thus turning OFF this diode.

During its charge period capacitor 60 actually charges to the source voltage $E_1$ minus the drop of resistor 40 and that of diode 50, which is very nearly the source voltage. The time allowed to store the energy in the capacitor is usually long (in typical applications longer than 0.5 milliseconds), therefore, resistor 64 can be reasonably large (a few hundred ohms). The energy required for breaking down the diode 78 is very small, thus a drive circuit designed to supply only the minimum drive current specified for the valve V (typically 100 to 200 milliamps) can easily be utilized in this arrangement to give the required high initial drive without any alteration. With respect to resistor 64, the higher the frequency, the smaller should be the resistor to sufficiently charge capacitor 60.

By way of example the components in FIG. 2 may have the following values:

| | |
|---|---|
| Source voltage $E_1$ | 14 volts. |
| Shockley diode **78** | 20 volts breakdown. |
| Resistors: | |
| R40 | 3 ohms. |
| **38** | 20 to 40 ohms. |
| **52** | 200 ohms. |
| **64** | About 500 ohms depending on frequency. |
| Capacitors: | |
| **60** | .1 to .5 microfarads. |
| C2 | .0005 microfarads. |
| Time constant of the capacitor discharge circuit **72** | About 25 microseconds. |

Asymmetric devices 36, 50, 66 and 74 may, for example, be semiconductor diodes.

Figure 4:
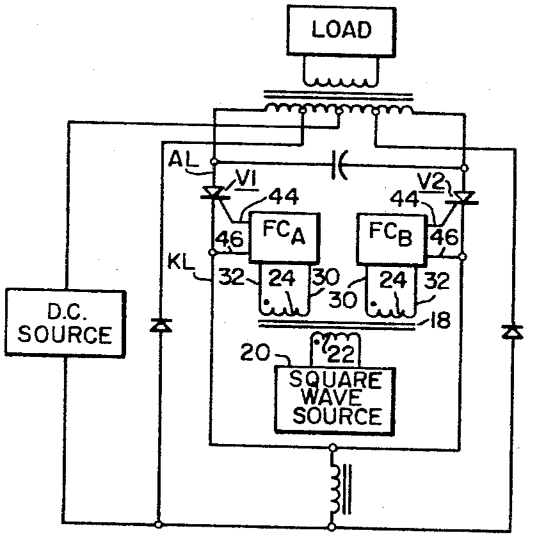
FIG. 4 is a schematic diagram of a particular application of the firing circuit of FIG. 2.

A particular application for the firing circuit of FIG. 2 is illustrated by way of example in FIG. 4, in connection with a well-known single phase parallel inverter of the type illustrated and described in the "Westinghouse Silicon Controlled Rectifier Designers Handbook," published by the Westinghouse Electric Corporation, first edition, page 7–17. Since the basic operation of this type of inverter is well known, it will not be described in detail. Sufficient to say that valves V1 and V2 are alternately turned ON by the firing circuits therefor, and alternately turned OFF by capacitor commutation.

In FIG. 4, each of the firing circuits $FC_A$ and $FC_B$ is the same as the circuit $FC_2$ in FIG. 2. The duplicate secondaries 24 are connected to the inputs of their respective associated circuits $FC_A$ and $FC_B$ in opposite polarity so that when transformer 18 is in one mode of operation the input line 30 of circuit $FC_A$ is positive while the input line 30 of circuit $FC_B$ is negative, and vice versa. Thus, while circuit $FC_A$ is firing valve V1, circuit $FC_B$ is negatively biasing the gate of valve V2 and vice versa.

Although the exemplary illustration in FIG. 2 is in connection with a symmetrical square wave oscillator, it should be understood that the firing circuit of the invention may be employed in applications where the two modes of the control power source 16 feeding the input lines 30 and 32 of the circuit $FC_2$ may be random and unsymmetrical to provide firing pulses in cases where the desired ratio of ON-OFF times of the valve is not necessarily 1:1, and may be variable.

The particular firing circuit shown in connection with the invention herein, is by way of example only, since the principles of the capacitor charge and discharge circuits of the invention may be employed in connection with other firing circuits.

Capacitor charge and discharge circuits in accordance with the present invention are especially applicable to drive circuits which supply negative gate bias to the solid state controllable valves.

From the disclosure herein, it should be apparent that the invention provides a simple, inexpensive solution for supplying very high initial drive current for solid state controllable valves working into non-inductive low impedance loads. The circuit also gives a very economical solution for driving large solid state controllable valves which require firing current pulses of high magnitude event if the *di/dt* is controlled.

It is to be understood that the herein described arrangements are simply illustrative of the principles of the invention, and that other embodiments and applications are within the spirit and scope of the invention.

I claim:

1. In a system wherein a solid state controllable valve having a control electrode is selectively switched ON and OFF at predetermined times to control current through a load, a firing circuit for said valve comprising a capacitor, a first circuit including said capacitor for charging said capacitor during the OFF time of the valve, a second circuit connected to said control electrode for applying a first firing signal to said control electrode, and a third circuit connected to said control electrode and said capacitor for discharging the capacitor to apply a second firing signal to said control electrode, said second signal having a shorter duration than the first signal, said second signal having a peak whose magnitude is substantially higher than the magnitude of said first signal, said second signal being coextensive in time with a forward portion adjacent the leading edge of the first signal, whereby the magnitudes of said firing signals are cumulative to provide a composite firing signal on said control electrode having a high peak which decays to the level of said first signal, and said composite firing signal has a high initial peak to provide high initial control electrode drive current.

2. The combination as in claim 1 wherein said first and third circuits are asymmetric circuits.

3. The combination as in claim 2 which further includes a fourth circuit connected to said control electrode for applying to the control electrode a reverse bias during the OFF time of said valve, said first circuit being energized by said fourth circuit.

4. The combination as in claim 3 which further includes control power source means operable in two modes, said source means having output means which assumes a first output condition when the source means is operating in one mode and a second output condition when the source means is operating in the other mode, said fourth circuit being connected to said output means to be energized by said source means in said one mode, said second circuit being connected to said output means to be energized by said source means in said other mode, said third circuit being operable to discharge said capacitor in response to said source operating in said other mode.

5. The combination as in claim 4 wherein said first and third circuits are asymmetric circuits.

6. The combination as in claim 4 wherein said third circuit includes in series said capacitor and a voltage breakdown device, and means responsive to said second output condition for subjecting said breakdown device to sufficient voltage cumulative with said capacitor charge to breakdown said breakdown device and thereby discharge said capacitor.

7. The combination as in claim 6 wherein said output means includes an output terminal connected to said second circuit, and said means for subjecting said breakdown device to sufficient voltage includes a trigger circuit connected to said output terminal.

8. The combination as in claim 4 wherein said valve is a semiconductor controlled rectifier including respective anode and cathode electrodes, and wherein said control electrode is the gate electrode, and wherein said output means includes an output terminal, and wherein said fourth circuit includes a loop circuit energized by said output means in said first output condition, said loop circuit including in series an asymmetric device and first and second adjacent resistance means, said asymmetric device being connected across said gate and cathode electrodes, said first resistance means being connected to said output terminal, said second resistance means being connected between said first resistance means and said gate electrode, said first circuit being connected across said first resistance means.

References Cited

UNITED STATES PATENTS

| | | | |
|---|---|---|---|
| 3,188,490 | 6/1965 | Hoff et al. | 307—252 |
| 3,384,763 | 5/1968 | Harris | 307—293 |

ARTHUR GAUSS, *Primary Examiner.*

B. P. DAVIS, *Assistant Examiner.*

U.S. Cl. X.R.

307—252, 293